United States Patent [19]

Rademacher

[11] 4,303,515

[45] Dec. 1, 1981

[54] CHEMICAL DISPENSER FOR BODIES OF WATER

[75] Inventor: Thomas P. Rademacher, Medina, Ohio

[73] Assignee: McNeil Corporation, Akron, Ohio

[21] Appl. No.: 139,690

[22] Filed: Apr. 14, 1980

[51] Int. Cl.³ .................................................. B01D 33/38
[52] U.S. Cl. ................................... 210/169; 210/198.1; 422/279; 422/283
[58] Field of Search ..................... 210/169, 198.1; 422/261, 279, 283

[56] References Cited

U.S. PATENT DOCUMENTS

| | | | |
|---|---|---|---|
| 1,409,248 | 3/1922 | Sevcik | 422/279 X |
| 2,517,487 | 8/1950 | Hill et al. | 422/261 X |
| 2,649,203 | 8/1953 | Hannibal | 422/261 X |
| 2,700,651 | 1/1955 | Tepas, Jr. et al. | 422/279 |
| 2,820,701 | 1/1958 | Leslie | 422/283 X |
| 3,003,518 | 10/1961 | Tisdale | 422/261 X |
| 3,094,134 | 6/1963 | Currie | 422/261 X |
| 3,595,395 | 7/1971 | Lorenzen | 210/169 |

FOREIGN PATENT DOCUMENTS

| | | | |
|---|---|---|---|
| 8925 | 3/1980 | European Pat. Off. | 210/169 |
| 457905 | 9/1913 | France | 422/261 |

*Primary Examiner*—Robert H. Spitzer
*Attorney, Agent, or Firm*—Hamilton, Renner & Kenner

[57] ABSTRACT

A chlorinator (10) for chemically treating with tablets (T) water in a swimming pool having a water recirculating system with a pump with output and input sides including, a cannister (11) having a bottom (12), a top (13) with an opening (15) and connecting sides (14), a lid (20) for effecting fluid-tight sealing of the top opening of the cannister, an inlet (25) supplying water to the cannister from the output side of the pump, an outlet (40) transferring treated water from the cannister to the input side of the pump, a support (75) angularly disposed between the bottom of the cannister and the connecting sides to submerge a substantially uniform quantity of the tablets in the water, and a controller (45) adjustable relative to the cannister to establish the water level (L) in the cannister and supply uniformly treated water through the outlet.

11 Claims, 1 Drawing Figure

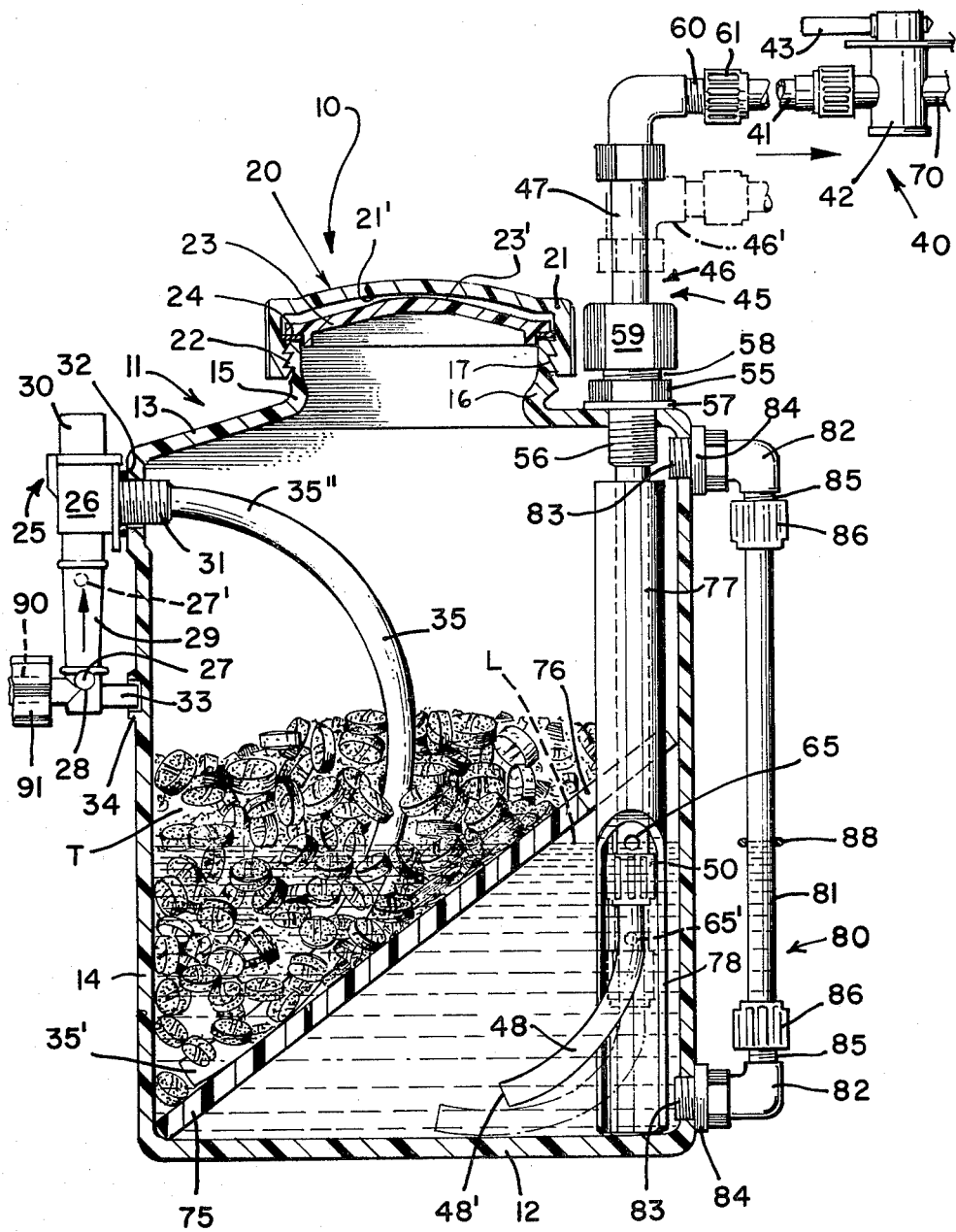

CHEMICAL DISPENSER FOR BODIES OF WATER

TECHNICAL FIELD

The present invention relates generally to a dispenser providing simplified variable control over the chemical treatment of swimming pool water, boiler systems and cooling towers. More particularly, the present invention relates to a dispenser for providing a supply of uniformly chlorinated water to a swimming pool. More specifically, the invention relates to a chlorinator for chemically treating swimming pool water with submerged tablets, the chlorinator operating in conjunction with conventional water recirculating systems for swimming pools.

BACKGROUND ART

Over the years numerous types of chlorinating devices have evolved for use in conjunction with swimming pools. The nature of such chlorinating devices has varied from complex, sophisticated treatment systems for use in conjunction with larger pools to small floating containers which are often employed in conjunction with pools which are volumetrically rather small. In recent years there has been a large influx in the number of intermediate size pools due in part to the proliferation of backyard pools in many parts of the country. The chlorination devices for neither large nor small pools have proven to be totally satisfactory for use in conjunction with intermediate pool sizes, the complex systems employed for large pools being excessively expensive to install and maintain and the floating containers for small pools having insufficient capacity and operating limitations, such as an inability to adequately distribute the chlorinated water output, incompatible with many intermediate pool sizes.

The chlorinators designed for small pool configurations have frequently employed an open container such that chlorination operations discharge a sufficient quantity of chlorine gas to provide an undesirable environment in the pool area. Efforts to adapt container chlorinators for small pools to the water recirculation systems of larger pool sizes have normally not eliminated the chlorine gas problems and have in many instances created additional problems. For example, a number of such systems supply a quantity of uniformly chlorinated water and rely upon the rate of flow of water through the chlorine to vary the chlorination output as required for a particular pool and under particular circumstances. Such flow control chlorination systems employed in conjunction with a pool water recirculation system frequently have the disability that an extent of clogging of the filter or other factors can significantly vary the flow rate which in turn varies the chlorination output to the pool. These and other problems have generally plagued chlorinators being employed in respect of intermediate and small size pools.

DISCLOSURE OF THE INVENTION

Therefore, an object of the present invention is to provide a chlorinator which is adapted for usage with a wide variety of standard water recirculation systems for a variety of pool sizes encompassing the small, intermediate size range. Another object of the present invention is to provide a chlorinator which is a closed system that prevents the discharge of chlorine gas into the air, the gaseous output being absorbed into water transmitted through the recirculation system. A further object of the invention is to provide a chlorinator, the chlorination output of which is controlled by the extent of emersion of chlorine tablets such as to provide adequate chlorination even in the event of reduced flow rates through the recirculation system as may be effected by intermittent pump operation, an extent of filter clogging or other factors. Yet another object of the invention is to provide a chlorinator which does not have obstructions to the flow of water therethrough, floats or valves actuated by the flow rate of the water, or similar elements which are notoriously unreliable in a pool environment.

Still another object of the present invention is to provide a chlorinator which may be readily installed in conjunction with most existing pool water recirculation systems. A further object of the invention is to provide a chlorinator wherein the chlorinated water output is derived from an area having substantially uniformly chlorinated water, free from clogging by conventional chlorination tablets or partially dissolved particulate matter. It is another object of the invention to provide a chlorinator which can be easily adapted to regulate the chlorination output without shutting down or dismantling the water recirculation system and which may be readily adjusted and recharged by operators having relatively little knowledge of the recirculation system and the components thereof.

In general, a chlorinator, according to the concepts of the invention, for chemically treating with tablets water in a swimming pool having a water recirculating system having a pump with output and input sides includes, a cannister having a bottom, a top with an opening and connecting sides, a lid for effecting fluid-tight sealing of the top opening of the cannister, an inlet supplying water to said cannister from the output side of the pump, an outlet transferring treated water from said cannister to the input side of the pump, a support angularly disposed between the bottom of the cannister and connecting the sides to submerge a substantially uniform quantity of the tablets in the water, and a controller adjustable relative to said cannister to establish the water level in said cannister and supply uniformly treated water through said outlet means.

BRIEF DESCRIPTION OF THE DRAWING

The drawing FIGURE is a vertical cross-sectional view of a chlorinator embodying the concepts of the present invention with portions shown in elevation and depicting multiple positions of certain movable elements, all as hereinafter described.

PREFERRED EMBODIMENT FOR CARRYING OUT THE INVENTION

A chlorinator for chemically treating water in the recirculating system of a swimming pool according to the concepts of the present invention is generally indicated by the numeral 10 in the attached drawing FIGURE. The chlorinator 10 has as its primary enclosing structure a cannister, generally indicated by the numeral 11. As shown, the cannister 11 has a bottom 12, a top 13 and one or more sides 14 interposed therebetween. It is to be appreciated that the cannister 11 may take a multitude of forms such as cylindrical, rectangular or other polygonal configuration. The cannister 11 is totally enclosed by the bottom 12, top 13 and sides 14 except for an opening 15 which may be integrally formed in the top 13 of cannister 11 for convenient access. As shown, the top opening 15 may be in the nature of a neck 16 which has threads 17 formed on the radially external portion thereof for a purpose to be hereinafter described.

For the purpose of effecting fluid-tight sealing of the cannister 11, a two-part lid, generally indicated by the numeral 20, is advantageously provided. As seen in the drawing, the lid 20 has a conventional cup-shaped body 21 which has internal threads 22 adapted to matingly engage the threads 17 of the neck 16 forming the top opening 15 of the cannister 11. Positioned interiorly of the cup-shaped body 21 is a disk 23 having a raised, preferably beveled, bearing surface 23' and mounting preferably proximate its radial extremity a gasket 24 which is positioned for engagement with the axial extremity of the neck 16. The axially inner surface 21' of cup-shaped body 21 engages the bearing surface 23' of disk 23 to thus apply force to the disk 23 to effect sealing by the gasket 24 when the body 21 is threaded onto the neck 16 as depicted in the drawing. The interrelationship of inner surface 21' and the bearing surface 23' permits an extent of tilting movement between cup-shaped body 21 and disk 23 so that the disk 23 may be seated on the neck 16 while facilitating alignment for the rotational starting and threading of the threads 22 of cup-shaped body 21. It is also to be appreciated that the cup-shaped body 21 may be readily removed and the disk member 23 thereafter released in the event of tendencies toward sticking engagement between the gasket 24 and the disk 23 or the axial extremity of neck 16 which may be intermittently encountered due to the chemical environment.

For purposes of supplying a controlled quantity of water internally of the chlorinator 10, a water inlet assembly, generally indicated by the numeral 25, is provided. The water inlet assembly 25 may conveniently be positioned in a side 14 proximate the top 13 of the cannister 11. As shown, the water inlet assembly includes a flow indicator control valve 26 which may be of conventional design. As shown, the flow control valve 26 is a type of ball valve having a ball element 27 which is movable from a seat 28 in a view tube 29. A pivoting valve element 30 is manually rotatable to control the flow of water through the flow control valve 26. The ball element 27 is displaced from its seat 28 in the viewing tube 29 a distance related to the flow of water through flow control valve 26, e.g., the chain line position 27', to provide visual indication of and permit duplication of particular desired flow.

The water inlet assembly 25 has a threaded projection 31 which preferably extends through the side 14 of cannister 11 and is threaded therein to sealingly collapse a gasket 32 interposed between side 14 and valve 26 to effect a fluid-tight seal. In order to enhance the stability of flow control valve 26 on cannister 11 the valve 26 may have a projecting leg 33 in spaced relation to the threaded projection 31 adapted to engage a dimple 34 formed in the side 14 of cannister 11.

The water supplied through the flow control valve 26 is directed and discharged at a selected position inside the cannister 11 by a tube 35. As shown, the tube is preferably of a flexible material to permit suitable deflection such that an extremity 35' discharging water may be positioned proximate the juncture of the side 14 and bottom 12 of the cannister 11. The other extremity 35" of the tube 35 is sealingly affixed within the threaded projection 31 of flow control valve 26. Thus, the water inlet assembly 25 provides a selected flow of water through control valve 26 which is discharged at extremity 35' of the flexible tube 35.

The water outlet assembly from the cannister 11 is generally indicated by the numeral 40 in the drawing FIGURE. The water outlet assembly 40 consists of an extent of tubing 41 which has a valve 42 positioned thereon. The valve 42 may be a conventional on/off valve actuated as by a manually operated lever 43.

Treated water is removed from the cannister 11 and transferred to the water outlet assembly 40 by a controller mechanism, generally indicated by the numeral 45. The controller mechanism 45 also controls the concentration of chlorination in the water in a manner hereinafter described. The controller mechanism 45 includes an elongate conduit, generally indicated by the numeral 46, an extent of which is a rigid tube 47 and an extent of which may be a flexible extender tube 48. The rigid tube 47 and the flexible extender tube 48 are joined in fluid-tight relation as by providing threads (not shown) on the extremity of rigid tube 47 and joining the flexible extender tube 48 thereto by a conventional coupling nut 50.

The conduit 46 is mounted preferably in the top 13 of the cannister 11 as by a collar 55 which may be externally threaded at 56 for threading into the cannister top 13. In order to effect a fluid-tight seal, a gasket 57 may be interposed between the collar 55 and the top 13 of cannister 11. The collar 55 is internally sized to slidingly but sealingly receive the rigid tube 47. The upstanding extremity of collar 55 may be provided with threads 58 to receive a coupling nut 59 having an internal o-ring seal (not shown) to lockingly engage rigid tube 47 and maintain it sealed in a selected position. The upper extremity of the conduit 46 may have threads 60 adapted to receive a standard coupling nut 61 which attaches conduit 46 to the tubing 41 of the water outlet assembly 40. The conduit 46 is provided with a port 65 which may conveniently be positioned proximate the connection between the rigid tube 47 and the flexible extender tube 48. As shown, the port 65 is positioned in the rigid tube 47 just above the coupling nut 50. Operationally, the port 65 in the sealed cannister 11 serves to establish the depth of water in cannister 11. The water outlet assembly 40 is connected to the input or suction side of a conventional pump by an outlet tubing 70 extending from the valve 42 of water outlet assembly 40. When the water level L reaches and covers the port 65 which starts suction action in conduit 46 concentrated uniformly treated water proximate the bottom 12 of cannister 11 is removed via the flexible extender tube 48 and rigid tube 47 and a substantially lesser quantity of water is contemporaneously drawn through the port 65. When the water level falls to partially or totally uncover the port 65, chlorine gas above the water level L in the cannister 11 is evacuated therethrough.

Cholorine tablets are positioned in the cannister 11 on an inclined support ramp, indicated by the numeral 75. The inclined support ramp 75 serves to support a quantity of standard chlorine tablets T thereabove while providing an area proximate the bottom 12 of the cannister 11 which is free of tablets to prevent blockage of the inlet 48' of the flexible extender tube 48. The ramp 75 is preferably sized such that it approaches the sides 14 of cannister 11 sufficiently close to preclude the escape of tablets T therebeyond to the bottom 12 of the cannister 11 while allowing an extent of space to permit the interchange of water above and below the ramp 75. Although variations in the size of cannister 11, the pool to be chlorinated and other factors may be significant, the configuration of the ramp to assume an angle of approximately 45° with the bottom 12 of the cannister 11 has proven operationally advantageous. Such provides for the submergence of a relatively small number of tablets T in the instance of a small pool volume while providing a sufficiently steep incline such that tablets T are constantly slidably repositioned downwardly toward the bottom 12 of cannister 11 as the tablets T are absorbed by the water.

Since the conduit 46 extends from the top 13 to the bottom 12 of cannister 11 the inclined support ramp 75 is necessarily discontinuous as by being provided with a cutout 76 through which the conduit 46 extends. In order to avoid interference with the coupling nut 50 and other complications the conduit 46 may be surrounded by a cylindrical housing 77 which extends substantially from the top 13 to the bottom 12 of the cannister 11. The cylindrical housing 77 is sized to accommodate the coupling nut 50 and allow the free passage thereof. The cutout 76 interfits with the cylindrical housing 77 in a manner comparable to the aforedescribed relationship between the ramp 75 and the sides 14 of the cannister 11. The cylindrical housing 77 is provided with a longitudinal slot 78 below the support ramp 75 and of sufficient circumferential extent to permit the flexible extender tube 48 to project therethrough. The tube 48 thus deflectingly adjusts so that its extremity 48' remains generally proximate the bottom 12 of cannister 11 wherever the conduit 46 is variously vertically positioned.

In order to monitor the water level L in the cannister 11 at any given time, the cannister 11 may advantageously be provided with a sight tube assembly, generally indicated by the numeral 80, which may be generally in the nature of a conventional boiler sight tube. The sight tube assembly 80 consists of a conventional translucent tubular member 81 of an extent covering the water level of the feasible operating range of chlorinator 10. The tubular member 81 is attached to a side 14 of cannister 11 by a pair of right angle nipples 82. One threaded extremity 83 of the nipples 82 threadably engage the side 14 of cannister 11 with a gasket 84 interposed therebetween to effect sealing engagement. The other threaded extremities 85 of the nipples 82 receive coupling nuts 86 which accommodate the two extremities of the tubular member 81. The tubular member 81 of sight glass 80 or a proximate portion of side 14 of cannister 11 may be provided with calibrated indicia indicative of the chlorination output to be achieved by chlorinator 10. In addition, a marker 88 which as shown may be an O-ring may be selectively vertically positioned along tubular member 81 to facilitate duplicating a selected level after refilling cannister 11 with tablets T or other servicing as hereinafter described. An appropriate indicia may be roughly computed by taking into consideration such factors as pool gallonage, pump operating time, and other factors well known to persons skilled in the art.

The chlorinator 10 is designed for installation in conjunction with a conventional water recirculation system for a swimming pool. Such systems normally have a line from the main drain and/or skimmer system which passes water to a pump and generally thereafter a filter and heater to a pool return inlet. Although variations in a system may dictate some extent of alterations, it is normally desirable that the outlet tubing 70 be connected to the suction or inlet side of the pump as in the water line or through the leaf basket drain nipple fitting, if available. The water inlet assembly 25 is supplied by a conduit 90 connected by coupling nut 91 to flow control valve 26 with water from a position on the outlet or pressure side of the pump. It is normally advantageous that conduit 90 be interconnected between the filter and heater on the pump pressure side so that the water supplied to chlorinator 10 is unheated but has particulate matter and other debris removed by filtering. Locating the interconnection of conduit 90 after the filter also has the advantageous effect of reducing inlet water pressure, as contrasted with interconnection directly after the pump, to provide a substantially greater suction pressure differential through outlet tubing 70 to insure that the water level is maintained at the port 65.

It will be readily apparent to persons skilled in the art that a variety of materials may be employed to construct the elements of chlorinator 10. With the present state of plastics technology the entire chlorinator 10 can feasibly be made of plastic elements selected by persons skilled in the art to operate satisfactorily while resisting the deleterious environmental effects of water, chlorine and sunlight.

Once interconnected in a pool water recirculation system as hereinabove described the chlorinator may be easily charged and actuated. This is effected by closing the valve 26 of water inlet assembly 25 and valve 42 of water outlet assembly 40, thus isolating cannister 11 from the water recirculation system. The lid 20 may then be removed and the cannister filled with chlorine tablets T substantially to the top. The lid 20 is then replaced to reestablish the fluid-tight seal to prevent the escape of noxious chlorine gas or loss of prime on pump and recirculation system, all other fittings being similarly sealed. Water flow is reestablished in the chlorinator 10 by opening the flow control valve 26 to a predetermined setting and permitting the cannister 11 to fill to a preselected operating level L based upon pool size and related parameters as discussed hereinabove. When the water reaches the selected level the valve 42 of water outlet assembly 40 is moved to the open position and flow is instituted and thereafter maintained with the water input not exceeding the water output capability, the port 65 having greater suction pressure than the pressure through water inlet assembly 25. It is to be appreciated that adjustments in the water level L may be required to provide the exact chlorination output desired for a particular pool. Such adjustment is readily effected by adjusting the vertical position of conduit 46 and thus port 65, as lower chlorination output would result, e.g., from positioning the conduit 46 in the chain line position 46' with port 65 in the position 65'. A uniform concentration will continue to be discharged so long as the cannister 11 remains solidly filled with chlorine tablets to a position above any set water level L. For continuing consistent operation the cannister 11 should be recharged on a regular basis before the level of tablets T falls below the water level L.

Thus, it should be evident that the chlorinator described herein carries out the various objects of the invention set forth hereinabove and otherwise constitutes an advantageous contribution to the art. As may be apparent to persons skilled in the art modifications in the usage of valve members, materials and other alterations could be employed without departing from the spirit of the invention, the scope of the invention being limited solely by the scope of the attached claims.

I claim:

1. A chlorinator for chemically treating with tablets water in a swimming pool having a water recirculating system including a pump with output and input sides comprising, a cannister having a bottom, a top with an opening and connecting sides, lid means for effecting fluid-tight sealing of the top opening of said cannister, inlet means supplying water to said cannister from the output side of the pump, outlet means transferring treated water from said cannister to the input side of the pump, support means angularly disposed between said bottom of said cannister and the connecting sides to submerge a substantially uniform quantity of the tablets in the water, and controller means adjustable relative to said cannister to establish the water level in said cannister and supply uniformly treated water through said outlet means, said controller means including conduit means a portion of which remains proximate the bottom of said cannister and said support means for removing uniformly treated water and said conduit means having port means establishing the water level in said cannister by movement to various positions between said bottom and said top of said cannister.

2. A chlorinator according to claim 1, wherein said conduit means is composed in part of a rigid tube and in part of a flexible tube, said flexible tube deflecting relative to said bottom of said cannister.

3. A chlorinator according to claim 2, wherein said port is positioned proximate the juncture of said rigid tube and said flexible tube.

4. A chlorinator according to claim 3, wherein a collar is positioned in said top of said cannister to slidably engage said rigid tube and lock means operating in conjunction with said collar temporarily secures said rigid tube at a selected position.

5. A chlorinator according to claim 1, wherein said support means has a cutout to accommodate said conduit means.

6. A chlorinator according to claim 5, wherein a cylindrical housing encompasses said conduit means and extends above and below said cutout in said support means.

7. A chlorinator according to claim 6, wherein said cylindrical housing has a longitudinal slot through which said flexible tube projects for positioning proximate said bottom of said cannister irrespective of where said port means is variously positioned in said cannister.

8. A chlorinator according to claim 7, wherein valve means in said inlet means and said outlet means provide flow of water such that the supply of water through said inlet means to said cannister does not exceed the supply of uniformly treated water to said outlet means, while maintaining pressure differentials which hold the water level at said port means.

9. A chlorinator according to claim 1, including means providing greater suction pressure in said outlet means than the pressure in said inlet means.

10. A chlorinator for chemically treating with tablets water in a swimming pool having a water recirculating system including a pump with output and input sides comprising, a cannister having a bottom, a top with an opening and connecting sides, lid means for effecting fluid-tight sealing of the top opening of said cannister, said lid means having a cup-shaped body and disk movable in tilting relationship thereto such that said disk seals said top opening of said cannister while said cup-shaped body threadingly engages said cannister, inlet means supplying water to said cannister from the output side of the pump, outlet means transferring treated water from said cannister to the input side of the pump, support means angularly disposed between said bottom of said cannister and the connecting sides to submerge a substantially uniform quantity of the tablets in the water, and controller means adjustable relative to said cannister to establish the water level in said cannister and supply uniformly treated water through said outlet means.

11. A chlorinator according to claim 10, wherein said cup-shaped body has a surface which engages a raised bearing surface on said disk, said disk carrying a gasket sealing member.

* * * * *